United States Patent
Osaka et al.

(10) Patent No.: US 12,152,325 B2
(45) Date of Patent: Nov. 26, 2024

(54) DRY-LAID NONWOVEN FABRIC PRODUCTION METHOD

(71) Applicant: Daicel Corporation, Osaka (JP)

(72) Inventors: Takuya Osaka, Tokyo (JP); Hiroaki Shintani, Tokyo (JP); Tatsuya Higashigaki, Tokyo (JP); Chihiro Tanaka, Tokyo (JP); Yuki Tsukamoto, Tokyo (JP); Kazuhiro Yamashita, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 17/778,859

(22) PCT Filed: Nov. 26, 2021

(86) PCT No.: PCT/JP2021/043444
§ 371 (c)(1),
(2) Date: May 23, 2022

(87) PCT Pub. No.: WO2023/095301
PCT Pub. Date: Jun. 1, 2023

(65) Prior Publication Data
US 2024/0328048 A1    Oct. 3, 2024

(51) Int. Cl.
*D04H 1/72* (2012.01)
*D04H 1/4382* (2012.01)

(52) U.S. Cl.
CPC ........... *D04H 1/72* (2013.01); *D04H 1/43825* (2020.05)

(58) Field of Classification Search
CPC .... D01G 13/00; D01G 15/00; D04H 1/43825; D04H 1/72
See application file for complete search history.

(56) References Cited

U.S. PATENT DOCUMENTS

| | | | | |
|---|---|---|---|---|
| 5,674,339 A | * | 10/1997 | Groeger | B32B 5/08 156/283 |
| 2015/0031257 A1 | * | 1/2015 | Ootsubo | D04H 1/72 264/320 |
| 2022/0282413 A1 | * | 9/2022 | Ito | D02G 1/12 |

FOREIGN PATENT DOCUMENTS

| | | | | |
|---|---|---|---|---|
| EP | 4023804 A1 | | 7/2022 | |
| JP | 2012188774 A | * | 10/2012 | |
| WO | WO-2013175581 A1 | * | 11/2013 | ........... B29C 70/502 |
| WO | 2021/039979 A1 | | 3/2021 | |

* cited by examiner

*Primary Examiner* — Shaun R Hurley
(74) *Attorney, Agent, or Firm* — XSENSUS LLP (57) ABSTRACT

A dry-laid nonwoven fabric production method may include: affixing resin particles including polymeric molecules to a plurality of first fibers; applying an external force to the plurality of first fibers to which the plurality of resin particles are affixed so as to reduce gaps between the first fibers; relieving the applied external force to form in gas, from the plurality of resin particles, second fibers each having an outer diameter smaller than that of the first fiber and the outer diameter of each of the second fibers have a value in a range from 30 nm to 1.0 μm; and forming a nonwoven fabric that is a fiber composite including the first fibers and the second fibers.

11 Claims, 4 Drawing Sheets

DRY-LAID NONWOVEN FABRIC PRODUCTION METHOD

CROSS-REFERENCE TO RELATED APPLICATION

The present application is a national stage application of International Application PCT/JP2021/043444, filed Nov. 26, 2021, the entire contents of which being incorporated herein by reference in its entirety.

TECHNICAL FIELD

The present disclosure relates to a dry-laid nonwoven fabric production method that produces a nonwoven fabric including a plurality of types of fibers.

BACKGROUND ART

Patent Document 1 discloses a production method in which particles are added to long fibers that are spun and transferred from a cabinet, and these particles form different fibers having outer diameters different from those of the long fibers to produce a fiber composite including a plurality of types of fibers having different outer diameters.

CITATION LIST

Patent Document

Patent Document 1: WO 2021/039979 A1

SUMMARY

Technical Problem

When producing a nonwoven fabric by using a fiber composite including a plurality of types of fibers, for example, an intermediate product including long fibers to which particles are added needs to be transported to a location including a nonwoven fabric production facility. This incurs time and effort to transport and transportation costs. In addition, impurities may adhere to the intermediate product during transportation, or the particles may fall off from the intermediate product during transportation. As a result, the quality of the nonwoven fabric decreases.

An object of the present disclosure is to, when producing a nonwoven fabric including a plurality of types of fibers having different outer diameters, be able to efficiently produce a high-quality nonwoven fabric.

Solution to Problem

In order to solve the problem described above, a dry-laid nonwoven fabric production method includes: affixing resin particles including high molecules that can be fiberized to a plurality of first fibers crimped and cut into short fibers: applying an external force to the plurality of first fibers to which the plurality of resin particles are affixed, thereby reducing gaps between fibers: relieving the applied external force to form in gas, from the plurality of resin particles, second fibers each having an outer diameter smaller than that of the first fiber and set to a value in a range from 30 nm to 1.0 µm; and forming a nonwoven fabric that is a fiber composite including the first fibers and the second fibers.

According to the production method described above, by using the plurality of first fibers cut into short fibers, the nonwoven fabric that is a fiber composite including the fine second fibers each having an outer diameter set to a value in the range from 30 nm to 1.0 µm, and the first fibers each having an outer diameter larger than that of the second fiber can be produced. Thus, for example, each of the steps described above can be sequentially performed in a single nonwoven fabric production apparatus. Therefore, in order to produce the nonwoven fabric including the first fibers and the second fibers, for example, it is not necessary to transport an intermediate product including a plurality of long fibers to which the plurality of resin particles are affixed, to a location including a nonwoven fabric production facility. As a result, time and effort to transport and transportation costs can be reduced. Additionally, deterioration of the quality of the nonwoven fabric, which is caused by transportation of the intermediate product, can be prevented. Further, according to the production method described above, the nonwoven fabric including the first fibers and the second fibers can be produced in gas. Accordingly, for example, drying of the fibers can be simplified compared to a wet-laid nonwoven fabric production method. Furthermore, the fibers can be suppressed from being excessively damaged by drying. Therefore, a high-quality nonwoven fabric can be efficiently produced.

30) The external force may be applied to the plurality of the first fibers to which the plurality of resin particles are affixed while heating the plurality of first fibers and the plurality of resin particles. Further, a heating temperature at the time of heating the plurality of first fibers and the plurality of resin particles may be set to a value in a range from 70° C. to 200° C. Therefore, the second fibers can be more easily formed from the plurality of resin particles. Furthermore, by applying heat to the first fibers to plasticize the first fibers, the plurality of first fibers are densely disposed, and thus the nonwoven fabric including fine gaps between fibers can be easily formed.

A carding process is performed on the plurality of first fibers to form the plurality of fibers into a sheet shape, and the plurality of resin particles may be affixed to the plurality of first fibers subjected to the carding process. Thus, the plurality of resin particles can be affixed to the plurality of first fibers that are processed into a sheet shape by the carding process, thereby aligning the first fibers in the fiber flow direction. Therefore, the plurality of resin particles can be uniformly affixed to each of the first fibers. Additionally, the resin particles can be prevented from adhering to a carding machine. As a result, the carding process can be stably performed on the plurality of first fibers.

The plurality of first fibers formed into the sheet shape by the carding process may be overlapped to form a fiber laminate, and the plurality of resin particles may be affixed to the plurality of first fibers of the fiber laminate. Thus, the resin particles can be affixed to the fiber laminate. As a result, a bulky nonwoven fabric including the first fibers and the second fibers can be produced. Additionally, at the time of forming the fiber laminate, the thickness of the fiber laminate can be adjusted by the degree of overlap of the plurality of first fibers, and thus the degree of freedom in design of the thickness of the nonwoven fabric can be improved. As a result, the nonwoven fabric having the characteristics of both the first fibers and the second fibers and having bulkiness can be efficiently produced.

A length dimension of the short fibers may be a value in a range from 10 mm to 100 mm. As a result, while the plurality of crimped first fibers are entangled with one another, the nonwoven fabric can be easily produced that includes plenty of gaps between fibers with the first fibers and the second fibers and has bulkiness. Additionally, when carding the plurality of first fibers, the plurality of first fibers can be efficiently carded while being prevented from being entangled with the carding machine.

Advantageous Effects

According to aspects of the present disclosure, when producing a nonwoven fabric including a plurality of fibers having different outer diameters, a high-quality nonwoven fabric can be efficiently produced.

DESCRIPTION OF EMBODIMENTS

Embodiments of the present disclosure will be described below with reference to the drawings.

First Embodiment

In a dry-laid nonwoven fabric production method according to a first embodiment, first, a plurality of resin particles 91 containing high molecules that can be fiberized are affixed to a plurality of first fibers 82 crimped and cut into short fibers. Next, an external force is applied to the plurality of first fibers 82 to which the plurality of resin particles 91 are affixed, which reduces the gaps between fibers. Thereafter, the external force is relieved and, in gas, second fibers 91a each having an outer diameter smaller than those of the plurality of first fibers 82 and set to a value in a range from 30 nm to 1.0 µm are formed from the plurality of resin particles 91, and a nonwoven fabric 84 that is a fiber composite including the first fibers and the second fibers is formed. For applying the external force and relieving the external force, a pair of thermal compression rolls 7 is used in the present embodiment as an example.

Figure 1:
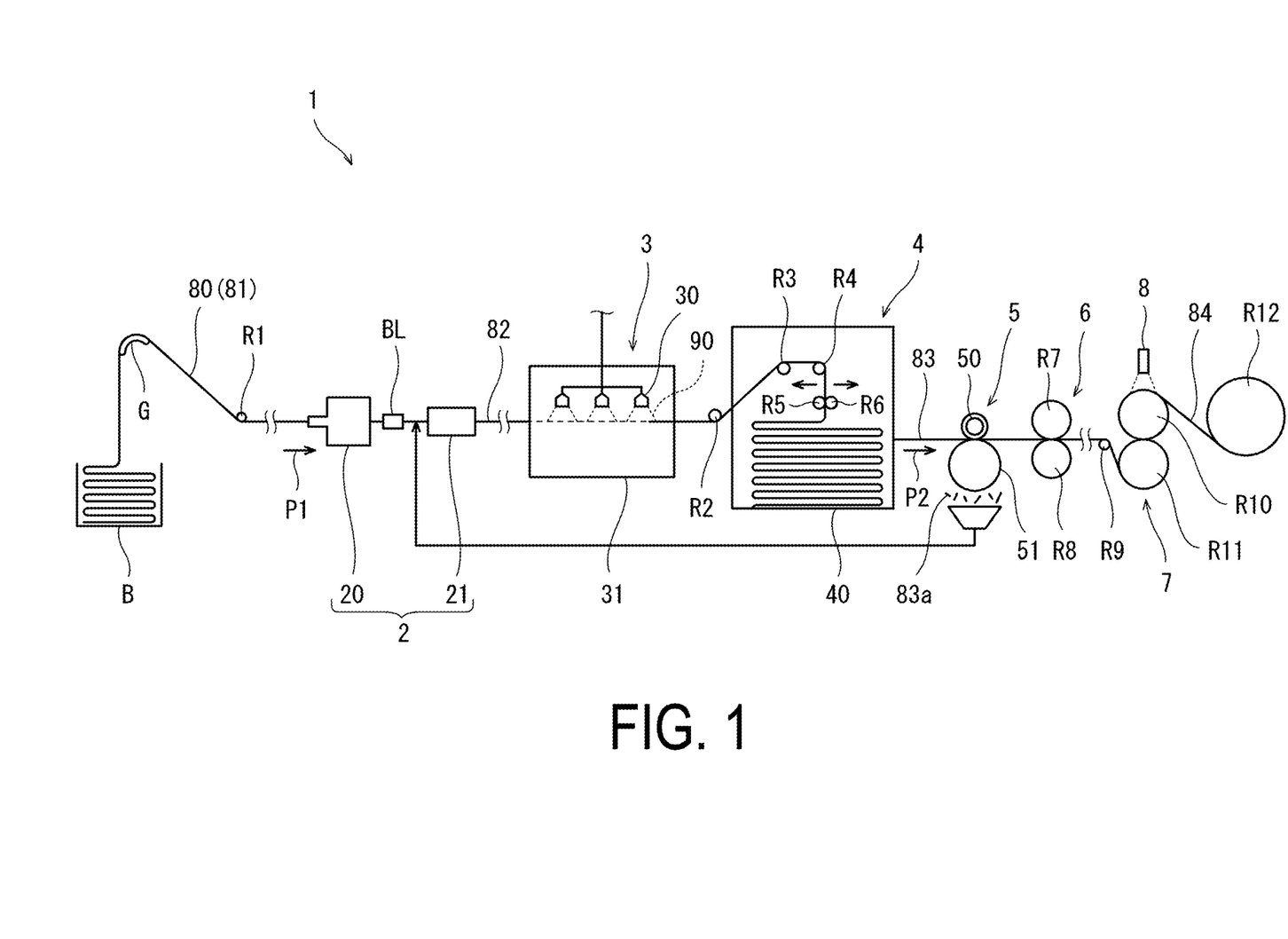
FIG. 1 is a schematic diagram of a nonwoven fabric production apparatus according to a first embodiment.

FIG. 1 is an overall view of a nonwoven fabric production apparatus 1 according to the first embodiment. The nonwoven fabric production apparatus 1 illustrated in FIG. 1 produces the nonwoven fabric 84 based on the dry-laid nonwoven fabric production method that produces a nonwoven fabric in gas (for example, in air). The nonwoven fabric 84 includes the first fibers 82 and the second fibers 91a. The nonwoven fabric referred to herein is a short fiber nonwoven fabric in compliance with Number 102 of JIS L 0222:2001.

In the present embodiment, when producing the nonwoven fabric 84, a bale-like band 80 that is folded and packaged in a packaging sleeve B is fed out. The first fibers 82 that are short fibers and constitute the material of the nonwoven fabric 84 are formed from the band 80. An outer diameter of the first fiber 82 can be adjusted as appropriate. The outer diameter of the first fiber 82 is a value in a range from 5 µm to 50 µm as an example, but is not limited thereto. The band 80 includes a plurality of long fibers 81 that are crimped. For example, the long fibers 81 include at least one of rayon, polypropylene, polyethylene terephthalate, polyethylene, or cellulose acetate. The long fibers 81 of the present embodiment include cellulose acetate. The material of the long fibers 81 can be selected as appropriate.

As illustrated in FIG. 1, the nonwoven fabric production apparatus 1 includes a guide member G that guides the band 80, a plurality of guide rolls R1 to R4, R7 that guide the tow band 80 in predetermined transfer directions P1, P2, and a short fiber forming unit 2. The short fiber forming unit 2 includes a cutter 20 that cuts the long fibers 81 to a predetermined length dimension to form the first fibers 82 that are short fibers, a blower (cotton blower) BL that transfers, in the transfer direction P1, the first fibers 82 discharged from the cutter 20, and a carding machine 21 that performs a carding process on the plurality of first fibers 82. The length dimension of the first fibers 82 formed by the cutter 20 in the present embodiment can be set as appropriate. The length dimension of the first fibers 82 is a value in a range from 10 mm to 100 mm, as an example. Also, in another example, the length dimension of the first fibers 82 is a value in a range from 30 mm to 100 mm. By setting the length dimension of the first fibers 82 to a value of 100 mm or less, for example, unnecessary entanglement of the first fibers 82 with respect to the carding machine 21 can be prevented. Additionally, by setting the length dimension of the first fibers 82 to a value of 10 mm or greater, the plurality of crimped first fibers 82 can be entangled with one another, and thus a bulky nonwoven fabric 84 with plenty of gaps between fibers can be easily produced.

The nonwoven fabric production apparatus 1 further includes a dispersion application apparatus 3 that applies a dispersion 90 including the plurality of resin particles 91 to the plurality of first fibers 82, and a cross layer (fiber laminate forming apparatus) 4 that layers the plurality of first fibers 82 to form a fiber laminate 83. As an example, the dispersion application apparatus 3 includes one or more nozzles 30 that spray the dispersion 90 supplied from outside toward the first fibers 82, and a housing 31 that houses the nozzles 30. In order to allow the dispersion 90 to penetrate into the fiber laminate 83, it is preferable that droplets of the dispersion 90 sprayed from the nozzles 30 are smaller, as an example. The configuration of the dispersion application apparatus 3 is not limited to that described above. For example, the dispersion application apparatus 3 may include a reservoir that stores the dispersion 90, and an application roll that is pivotally supported in a state where the dispersion 90 in the reservoir is applied to the roll surface to be applied to the first fibers 82. The dispersion 90 of the present embodiment is an aqueous dispersion. The dispersion 90 may include a liquid other than water. By using an aqueous dispersion, the dispersion 90 can be produced relatively inexpensively. In addition, the dispersion 90 can be easily handled.

The resin particles 91 contain lamellar structures. The lamellar structure herein referred to corresponds to a structure in which polymer chains constituting a resin of the resin particles 91 are linked and folded. The lamellar structures contained in the resin particles 91 are formed of fine fibers, specifically, in which the polymer chains are linked in millions and formed into a ribbon shape. The fine fibers are folded and stored in the resin particles 91.

The resin particles 91 are primary particles. The plurality of resin particles 91 are bonded to one another to form secondary particles. When an external force is applied to the secondary particles (in other words, two or more bonded resin particles 91) and the resin particles 91 are separated, the fine fibers are drawn out of the resin particles 91, and the second fibers 91a are formed from the resin particles 91. The dispersion 90 of the present embodiment contains the primary particles including the plurality of resin particles 91 in a dispersed manner in a solvent. The dispersion 90 is applied to the first fibers 82, and thus the plurality of resin particles 91 are dispersed and affixed to the surface of the first fibers 82. As an example, the secondary particles of the plurality of resin particles 91 are affixed to the surface of the first fibers 82.

As described below; the external force is applied to the plurality of first fibers 82 to which the plurality of resin particles 91 are affixed, and the gaps between fibers are reduced. Therefore, the plurality of resin particles 91 affixed to the surfaces of different first fibers 82 are bonded together. In addition, the external force applied to the plurality of first fibers 82 is relieved, and the bonded resin particles 91 are separated. As a result, the second fibers 91a are formed (see FIGS. 2 and 3).

The resin particles 91 may be formed, for example, by a polymerization reaction and may contain lamellar structures. The resin particles 91 contain, for example, at least one of PTFE (polytetrafluoroethylene), polypropylene, polyethylene, or polyamide. The resin particles 91 of the present embodiment include PTFE.

Here, the resin particles 91 are set to have a mean particle size of a value in a range from 100 nm to 100 μm, for example. As an example, the value of the mean particle size is further preferably in a range from 200 nm to 700 nm, and is still further preferably in a range from 250 nm to 400 nm. Note that the mean particle size herein refers to the median diameter (cumulative 50% diameter (D50)) calculated from measurement results of dynamic light scattering. The resin particles 91 are formed, for example, by paste extrusion.

The cross layer 4 layers in an overlapped manner (here, for example, layers in a folded manner) the plurality of first fibers 82 in a sheet shape to which the resin particles 91 are affixed to form the fiber laminate 83. As an example, the cross layer 4 includes the plurality of rolls R2 to R6 that guide the plurality of first fibers 82 in a sheet shape, and a housing 40 that houses the rolls R3 to R6. In the cross layer 4 of the present embodiment, the plurality of first fibers 82 in a sheet shape are guided to the upper side of the interior of the housing 40 by the rolls R3, R4, and then are guided downward by the pair of rolls R5, R6. At this time, the plurality of first fibers 82 are guided back and forth in one direction orthogonal to the vertical direction, and are folded and layered. As a result, the fiber laminate 83 is formed. As an example, the one direction and the transfer direction P2 of the fiber laminate 83 discharged from the cross layer 4 intersect with the transfer direction P1 of the plurality of first fibers 82 when introduced into the cross layer 4. Note that the plurality of first fibers 82 in a sheet shape are not long fibers but short fibers. Therefore, the plurality of first fibers 82 in a sheet shape have, for example, a relatively small restoring force at the 20) overlapped portion compared to a plurality of long fibers formed in a sheet shape. As a result, the plurality of first fibers 82 in a sheet shape can be easily overlapped, and the fiber laminate 83 can be efficiently formed.

Further, the nonwoven fabric production apparatus 1 includes a slitter 5 that cuts an unnecessary portion (for example, both ends in a width direction of the fiber laminate 83) of the fiber laminate 83 discharged from the cross layer 4, and a pair of pressure rolls 6 that allow the fiber laminate 83 passed through the slitter 5 to be compressed in the thickness direction and that adjust the thickness of the fiber laminate 83. The slitter 5 includes a transfer roll 51 that transfers the fiber laminate 83 and a cutting roll 50 that cuts a portion of the fiber laminate 83. A cut portion 83a of 30 the fiber laminate 83 is, for example, introduced into the carding machine 21 and reused. The pair of pressure rolls 6 include a pair of pressure rolls R7, R8.

Furthermore, the nonwoven fabric production apparatus 1 includes a pair of thermal compression rolls 7 that allow the fiber laminate 83 passed through the pair of pressure rolls 6 to be thermally compressed in the thickness direction to heat the plurality of first fibers 82 and the plurality of resin particles 91 and apply the external force, an electret apparatus 8 that causes the fiber laminate 83 to be electrically polarized, and a winding roll R12 that winds up the nonwoven fabric 84. The pair of thermal compression rolls 7 include a pair of thermal compression rolls R10, R11, the roll surfaces of which are to be heated. The pair of pressure rolls 6 of the present embodiment apply the external force to the fiber laminate 83 while heating the fiber laminate 83. The heating temperature of the plurality of first fibers 82 and the plurality of resin particles 91 by the pair of thermal compression rolls 7 can be adjusted as appropriate. The heating temperature can be set to a temperature in a range of, for example, from 25° C. to 200° C. The heating temperature is preferably a temperature, for example, in a range from 50° C. to 200° C., more preferably a temperature in a range from 70° C. to 200° C., and still more preferably a temperature in a range from 90° C. to 200° C. In yet another example, the heating temperature is preferably a temperature in a range from 110° C. to 200° C., and more preferably a temperature in a range from 150° C. to 200° C. The heating temperature may be, for example, below the melting point of each material of the first fibers 82 and the resin particles 91, or may be below the decomposition temperature of each of the materials. The electret apparatus 8 causes the fiber laminate 83 to be polarized, and thus filtration performance as performance when the nonwoven fabric 84 is used as a filtration member, for example, is improved. Note that, when the application of the nonwoven fabric 84 is an application other than filtration, the electret apparatus 8 may be omitted.

When the nonwoven fabric production apparatus 1 is driven, the bale-like band 80 (the plurality of crimped long fibers 81) housed in the packaging sleeve B is fed out, and the band 80 is guided by the guide member G and the guide roll R1 to be introduced into the short fiber forming unit 2. In the short fiber forming unit 2, the band 80 is introduced into the cutter 20 and cut. Thus, the plurality of crimped first fibers 82 are formed. The plurality of first fibers 82 are introduced into the carding machine 21 to be carded. Thus, impurities are removed from the plurality of first fibers 82, and the thickness dimension and the fiber flow direction are adjusted. The plurality of carded first fibers 82 are formed into a sheet shape with plenty of gaps between fibers while being entangled with one another. The dispersion 90 is applied by the dispersion application apparatus 3 to the plurality of first fibers 82 in a sheet shape. Thus, the plurality of resin particles 91 containing high molecules that can be fiberized are affixed to the plurality of first fibers 82 crimped and cut into short fibers.

The plurality of first fibers 82 discharged from the dispersion application apparatus 3 are introduced into the cross layer 4. Consequently, the fiber laminate 83 is formed. The fiber laminate 83 discharged from the cross layer 4 is guided in the transfer direction P2 and introduced into the slitter 5. As a result, both sides in the width direction of the fiber laminate 83 are cut. The fiber laminate 83 passed through the slitter 5 passes through a nip point of the pair of pressure rolls 6 and is formed into a sheet shape having a thickness that is adjusted. The fiber laminate 83 passed through the nip point of the pair of pressure rolls 6 is guided by the guide roll R9 and passes through a nip point of the pair of thermal compression rolls 7, therefore being thermally compressed. Thus, the external force is applied to the plurality of first fibers 82 and the plurality of resin particles 91 in the fiber laminate 83 in a state where the first fibers 82 and the resin particles 91 are heated. As a result, because the external force is applied to the plurality of first fibers 82 to which the plurality of resin particles 91 are affixed, the gaps between fibers are reduced. In addition, the first fibers 82 are heated and plasticized to some extent. After the fiber laminate 83 passes through the nip point of the pair of thermal compression rolls 7, the external force is relieved. Along with such processing, the plurality of second fibers 91a are formed from the plurality of resin particles 91. The plurality of first fibers 82 and the plurality of second fibers 91a are electrically polarized by the electret apparatus 8. As a result, the nonwoven fabric 84 is formed. The nonwoven fabric 84 is wound by the winding roll R12. The nonwoven fabric 84 is cut, for example, into predetermined dimensions to be used.

Figure 2:
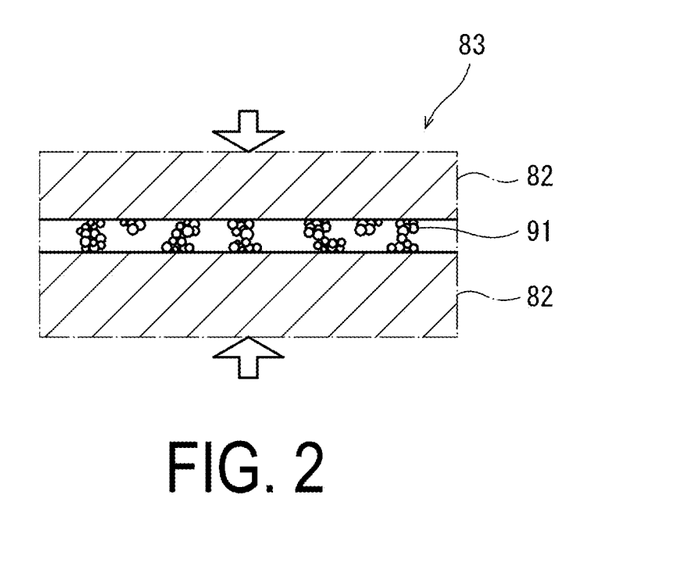
FIG. 2 is a schematic cross-sectional view of a fiber laminate in FIG. 1.

FIG. 2 is a schematic cross-sectional view of the fiber laminate 83 of FIG. 1. As illustrated in FIG. 2, when the fiber laminate 83 passes through the nip point of the pair of thermal compression rolls 7, nip pressure is applied as the external force to the plurality of first fibers 82 to which the plurality of resin particles 91 are affixed, while heating the plurality of first fibers 82 and the plurality of resin particles 91, and the gaps between fibers are reduced. In the plurality of first fibers 82, the gaps between fibers are reduced. In addition, the plurality of resin particles 91 affixed to the first fibers 82 are bonded together, which forms high-order particles of the resin particles 91. When the first fibers 82 separate from the nip point of the pair of thermal compression rolls 7, the external force is relieved. As an example, an external force set to a value of 0.05 MPa or greater is applied to the plurality of first fibers 82 to which the plurality of resin particles 91 are affixed. Accordingly, the external force is adequately applied to the plurality of resin particles 91, and the second fibers 91a can be easily formed. Note that the upper limit value of the external force may be, for example, several tens of MPa.

Figure 3:
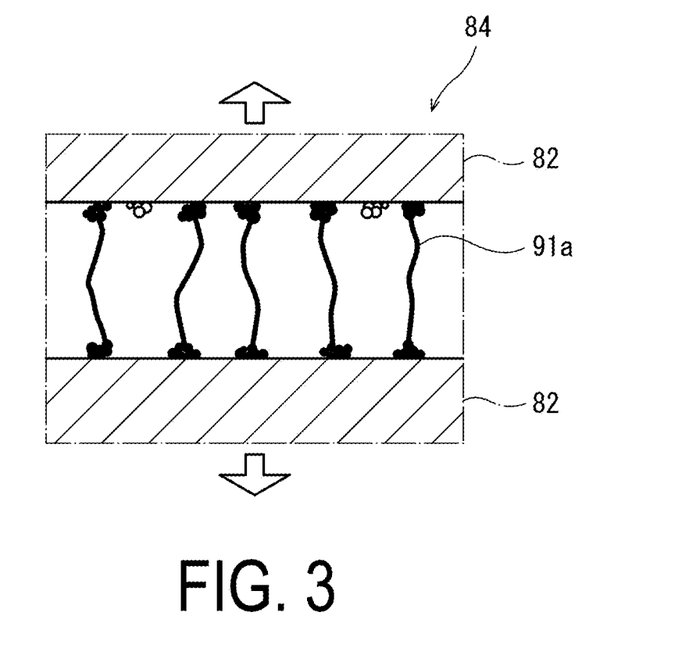
FIG. 3 is a schematic cross-sectional view of the nonwoven fabric in FIG. 1.

FIG. 3 is a schematic cross-sectional view of the nonwoven fabric 84 in FIG. 1. As illustrated in FIG. 3, when the external force is relieved, tensile force is applied to the resin particles 91 to separate the resin particles 91 bonded to one another between the different first fibers 82. Therefore, the fine fibers folded into the resin particles 91 are stretched, and the second fibers 91a are formed as a bridge between the plurality of different first fibers 82. As a result, the nonwoven fabric 84 that is a fiber composite including the first fibers 82 and the second fibers 91a is formed.

The second fiber 91a is set to have an outer diameter smaller than that of the first fiber 82 and to have a value in the range from 30 nm to 1.0 μm. Further, the second fibers 91a are supported by the first fibers 82 while being entangled with the first fibers 82 within the nonwoven fabric 84. Accordingly, even when the second fiber 91a is significantly thinner than the first fiber 82, the second fiber 91a can be supported by the first fiber 82 while being prevented from being cut. Therefore, the function of the second fibers 91a can be maintained for a long period of time. The second fibers 91a are dispersedly disposed throughout the inside of the nonwoven fabric 84. The resin particles 91 in the fiber laminate 83 may decrease or disappear due to the formation of the second fibers 91a.

A weight ratio W1/W2 of a total weight W1 of the first fibers 82 of the nonwoven fabric 84 to a total weight W2 of the second fibers 91a and the residual resin particles 91 can be set as appropriate. In the present embodiment, the nonwoven fabric 84 having the weight ratio W1/W2 set to a value in a range from, for example, 3.00 to 200.00 is formed. As a result, in the nonwoven fabric 84, the function of the second fibers 91a can be easily exerted while the second fibers 91a are stably supported by the first fibers 82.

Note that a variety of components of a known nonwoven fabric production apparatus (for example, at least one of a metal detector, an iron removing machine, an adding device for adding various additives, a feeding roll for feeding sheet to be affixed to the fiber laminate 83, or a paste application device for applying a paste used in attaching a sheet to at least a portion of the fiber laminate 83) may be disposed between the pair of pressure rolls 6 and the pair of thermal compression rolls 7. Further, a drying machine that dries the fiber laminate 83 to which the dispersion 90 is applied may be disposed between the dispersion application apparatus 3 and the pair of thermal compression rolls 7. Furthermore, at least one of a measuring tank for measuring the plurality of first fibers 82, a mixing and blowing machine, a blower, or a measuring feeder may be disposed between the cutter 20 and the carding machine 21.

As described above, according to the production method of the present embodiment, by using the plurality of first fibers 82 cut into short fibers, the nonwoven fabric 84 that is a fiber composite including the fine second fibers 91a having an outer diameter set to a value in the range from 30 nm to 1.0 μm, and the first fibers 82 having an outer diameter larger than those of the second fibers 91a can be produced. Thus, for example, each of the steps described above can be sequentially performed in a single nonwoven fabric production apparatus 1. Therefore, in order to produce the nonwoven fabric 84 including the first fibers 82 and the second fibers 91a, for example, it is not necessary to transport an intermediate product including the plurality of long fibers 81, to which the plurality of resin particles 91 are affixed, to a location including a nonwoven fabric production facility. As a result, time and effort to transport and transportation costs can be reduced. Additionally, deterioration of the quality of the nonwoven fabric, which is caused by transportation of the intermediate product, can be prevented. Further, according to the production method described above, the nonwoven fabric 84 including the first fibers 82 and the second fibers 91a can be produced in gas. Accordingly, for example, drying of the fibers 82, 91a can be simplified compared to a wet-laid nonwoven fabric production method. Furthermore, the fibers 82, 91a can be suppressed from being excessively damaged by drying. Therefore, the nonwoven fabric 84 having high quality can be efficiently produced.

In addition, according to the production method described above, by combining the fine second fibers 91a with the first fibers 82, the nonwoven fabric 84 including the plurality of second fibers 91a supported by the plurality of first fibers 82 is produced. Here, the plurality of first fibers 82 are short fibers that are crimped and entangled with one another extending in a plurality of different directions within the nonwoven fabric 84. Thus, for example, as compared to a fiber article including the plurality of long fibers 81 and the plurality of second fibers 91a, the nonwoven fabric 84 as a fiber article having bulkiness and plenty of gaps between fibers can be produced. Here, according to study conducted by the inventors of the present application, the nonwoven fabric 84 can have a basis weight (g/m$^2$) that is largely reduced to nearly half compared to that of a fiber article including the plurality of long fibers 81 and the plurality of second fibers 91a.

In addition, the high-quality nonwoven fabric 84 that can exert the function of the second fibers 91a for a long period of time in gaps between fibers can be produced. Further, for example, by spraying the dispersion 90 including the resin particles 91 onto the plurality of first fibers 82, the dispersion 90 can be easily incorporated deeply into the gaps between fibers. Accordingly, the second fibers 91a can be disposed uniformly in the nonwoven fabric 84. Therefore, the nonwoven fabric 84 having high quality can be stably produced. Furthermore, for example, as compared to a fiber article including the plurality of long fibers 81 and the plurality of second fibers 91a, the nonwoven fabric 84 can provide increased entanglement between the fibers and can suppress crudeness and unevenness of the fibers.

In addition, according to the production method described above, the nonwoven fabric 84 can be efficiently and serially produced, for example, by using the nonwoven fabric production apparatus 1 consolidated in one location. Thus, the number of production processes are reduced, and production costs of the nonwoven fabric 84 can be reduced. Moreover, according to the present embodiment, the nonwoven fabric 84 having both a good bulkiness and a good void ratio can be efficiently produced.

Further, in the present embodiment, the external force is applied to the plurality of first fibers 82 to which the plurality of resin particles 91 are affixed, while heating the plurality of first fibers 82 and the plurality of resin particles 91. Furthermore, as an example, the heating temperature at the time of heating the plurality of first fibers 82 and the plurality of resin particles 91 is set to a value in the range from 70° C. to 200° C. As a result, heat is applied to the plurality of resin particles 91, and thus the second fibers 91a can be more easily formed from the resin particles 91. Additionally, by applying heat to the first fibers 82 to plasticize the first fibers 82, the plurality of first fibers 82 are densely disposed, and the nonwoven fabric 84 including fine gaps between fibers can be easily formed.

Further, according to the production method of the present embodiment, the plurality of first fibers 82 are formed into a sheet shape by a carding process, and the plurality of resin particles 91 are affixed to the plurality of first fibers 82 subject to the carding process. Thus, the plurality of resin particles 91 can be affixed to the plurality of first fibers 82 that are processed into a sheet shape by the carding process, thereby aligning the first fibers 82 in the fiber flow direction. Therefore, the plurality of resin particles 91 can be uniformly affixed to each of the first fibers 82. Additionally, the resin particles 91 can be prevented from adhering to the carding machine. Therefore, the carding process can be stably performed on the plurality of first fibers 82.

Furthermore, in the present embodiment, the nonwoven fabric 84 having the weight ratio W1/W2 set to a value in the range from 3.00 to 200.00 is formed. As a result, the second fibers 91a are stably supported by the first fibers 82, and the function of the second fibers 91a can be easily exerted. Additionally, in the present embodiment, as an example, the first fibers 82 having the outer diameter set to a value in the range from 5 μm to 50 μm are used. As a result, the difference between the outer diameters of the first fiber 82 and the second fiber 91a is increased, and the degree of freedom in design of the nonwoven fabric 84 can be improved.

Moreover, in the present embodiment, the length dimension of the short fibers (first fibers 82) is a value in the range from 10 mm to 100 mm. Thus, the nonwoven fabric 84 can be easily produced while the plurality of crimped first fibers 82 are made to entangle with one another, the nonwoven fabric 84 including plenty of gaps between fibers with the first fibers 82 and the second fibers 91a and having bulkiness. Additionally, when carding the plurality of first fibers 82, the plurality of first fibers 82 can be efficiently carded while being prevented from being entangled with the carding machine 21. Another embodiment will be described below focusing on differences from the first embodiment.

Second Embodiment

Figure 4:
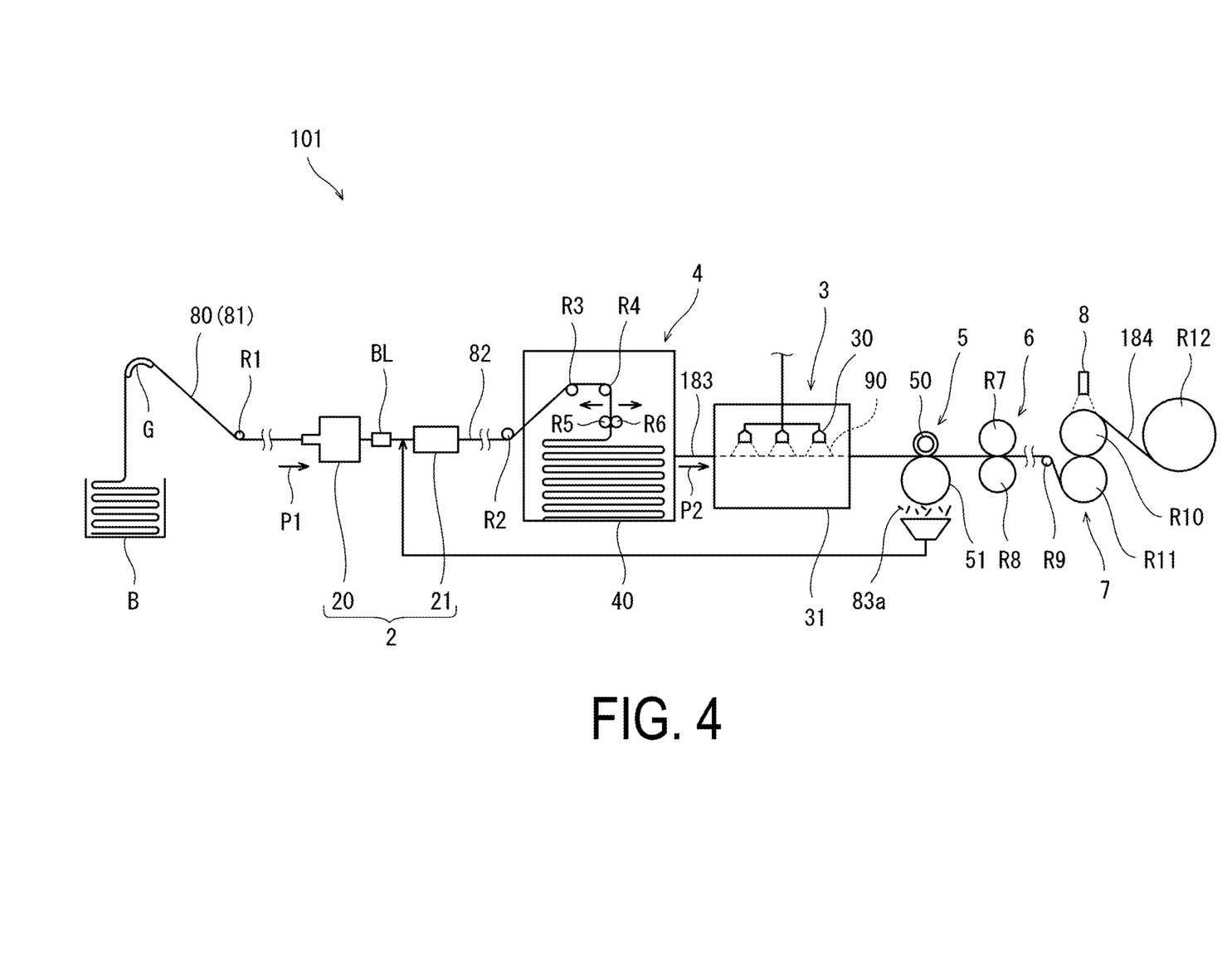
FIG. 4 is a schematic view of a nonwoven fabric production apparatus according to a second embodiment of the present disclosure.

FIG. 4 is a schematic view of a nonwoven fabric production apparatus 101 according to a second embodiment of the present disclosure. The nonwoven fabric production apparatus 101 differs from the nonwoven fabric production apparatus 1 in that the cross layer 4 is disposed closer to the carding machine 21 side than the dispersion application apparatus 3 in the transfer direction P1. When producing a nonwoven fabric 184, the dispersion 90 is applied to the plurality of first fibers 82 that have been carded. As a result, the plurality of first fibers 82 to which the plurality of resin particles 91 are affixed are introduced into the cross layer 4, thereby forming a fiber laminate 183 to which the plurality of resin particles 91 are affixed. The nonwoven fabric 184 is formed from the fiber laminate 183.

As just described, in the nonwoven fabric production method of the second embodiment, the plurality of first fibers 82 formed into a sheet shape by a carding process are folded and layered to form the fiber laminate 183, and the plurality of resin particles 91 are affixed to the plurality of first fibers 82 of the fiber laminate 183.

According to this production method, the resin particles 91 can be affixed to the fiber laminate 183. Thus, the bulky nonwoven fabric 184 including the first fibers 82 and the second fibers 91a can be produced. Additionally, at the time of forming the fiber laminate 183, the thickness of the fiber laminate 183 can be adjusted by the degree of overlap of the plurality of first fibers 82, and thus the degree of freedom in design of the thickness of the nonwoven fabric 184 can be improved. Therefore, the nonwoven fabric 184 having the characteristics of both the first fibers 82 and the second fibers 91a and having bulkiness can be efficiently produced.

Confirmation Test

Next, confirmation tests to confirm the performance of the present disclosure will be described. The present disclosure is not limited to the Examples described below:

The plurality of first fibers 82 were formed by using the long fibers 81 each having an outer diameter set to a value in the range from 5 μm to 50 μm and corresponding to crimped cellulose acetate (CA) fibers. Further, the plurality of resin particles 91 each having a mean particle size set to a value in the range from 100 nm to 100 μm and including PTFE were prepared. By using the first fibers 82 and the resin particles 91 and using the nonwoven fabric production apparatus 1 of the first embodiment, the nonwoven fabric 84 including the first fibers 82 and the second fibers 91a was produced. Furthermore, by using the first fibers 82 and the resin particles 91 and using the nonwoven fabric production apparatus 101 of the second embodiment, the nonwoven fabric 184 including the first fibers 82 and the second fibers 91a was produced.

When producing the nonwoven fabrics 84, 184, the heating temperature (compression temperature) for heating the first fibers 82 and the resin particles 91 at the time of compressing the fiber laminates 83, 183 by the pair of thermal compression rolls 7 was set to a temperature of any of room temperature (25° C.), 70° C., 90° C., 110° C., 150° C., and 200° C. As a result, the heating temperatures for heating the plurality of first fibers 82 and the plurality of resin particles 91 at the time of applying the external force to the plurality of first fibers 82 to which the plurality of resin particles 91 are affixed are different from each other. As described above, the nonwoven fabrics 84, 184 differing from each other were produced as samples of Examples 1 to 10. Of the samples, the samples of Examples 1 to 5 were produced by the production method of the first embodiment based on a dry-laid nonwoven fabric production method. In addition, the samples of Examples 6 to 10 were produced by the production method of the second embodiment based on a dry-laid nonwoven fabric production method.

Moreover, in accordance with the description of the first embodiment in Patent Document 1, a plurality of CA fibers being the long fibers 81 each having the outer diameter set to a value in the range from 5 μm to 50 μm were spun. The resin particles 91 each having the mean particle size set to a value in the range from 100 nm to 100 μm and including PTFE were affixed to the CA fibers. Thereafter, the plurality of CA fibers were crimped, and a bale-shaped band was produced. The band was compressed and packaged into the packaging sleeve B. The band was fed out from the packaging sleeve B, and the filaments of the band were opened with gas in the width direction. Subsequently, the filaments of the band were further opened by applying, with two pairs of opening rolls disposed separated in a predetermined transfer direction, tensile force in the transfer direction. The second fibers 91a were formed by nip pressure from a pair of nip rolls at the time of crimping and external force applied at the time of opening the filaments. Thus, a fiber article including the long fibers 81 and the second fibers 91a was produced as a sample of Comparative Example 1.

For each of the samples of Examples 1 to 10 and Comparative Example 1, the collection efficiency of particles when air containing NaCl particles having a particle size of 0.3 μm was passed through the fiber article at a flow rate of 5.3 cm/see was measured. As can be evaluated, for example, the performance of the sample as a filtration member increases as the collection efficiency value increases. The measurement results of the collection efficiency are indicated in Table 1.

fibers 82 are short fibers and are crimped and entangled with one another extending in a plurality of different directions within the nonwoven fabric 84, 184, resulting in bulky samples formed with plenty of gaps between fibers, thereby improving filtration performance. Additionally, in Examples 1 to 10, it was confirmed that a higher compression temperature from an ordinary temperature (25° C.) increases the collection efficiency. The following can be given as the reason for this. In Examples 1 to 10, a higher compression temperature resulted in the plurality of first fibers 82 being plasticized more easily. Thus, the gaps between fibers formed by the plurality of first fibers 82 and the plurality of second fibers 91a in the samples are made thinner and the filtration performance is further improved.

According to the present test results, the heating temperature of the plurality of first fibers 82 and the plurality of resin particles 91 is, for example, preferably a value in a range from 25° C. to 200° C., and is more preferably a value in a range from 70° C. to 200° C. In addition, the collection efficiency of the nonwoven fabric is a value in a range from 26% to 92%, is a value in a range from 38% to 92% in another example, and is a value in a range from 65% to 92% in yet another example.

Note that each of the configurations, combinations thereof, or the like in each of the embodiments are examples, and additions, omissions, replacements, and other changes to the configurations may be made as appropriate without departing from the spirit of the present disclosure. The present disclosure is not limited by the embodiments and is limited only by the scope of the claims. Also, aspects disclosed in the present specification can be combined with any other feature disclosed herein.

The nonwoven fabric produced by the production method of the present disclosure is not limited to a filtration member that filters impurities from fluid, and may be used in other applications such as an absorbent member used in hygiene items. Further, when the external force is applied to the plurality of first fibers 82 and the plurality of resin particles 91, the first fibers 82 and the resin particles 91 need not necessarily be heated. Furthermore, instead of using the dispersion application apparatus 3, a powder application apparatus that applies powdered resin particles 91 to the first fibers 82 may be used.

TABLE 1

| | Sample production method | Collection efficiency (%) | Compression temperature (° C.) |
|---|---|---|---|
| Example 1 | Production method of first embodiment | 76 | 110 |
| Example 2 | Production method of first embodiment | 65 | 90 |
| Example 3 | Production method of first embodiment | 38 | 70 |
| Example 4 | Production method of first embodiment | 92 | 150 |
| Example 5 | Production method of first embodiment | 90 | 200 |
| Example 6 | Production method of second embodiment | 76 | 90 |
| Example 7 | Production method of second embodiment | 76 | 110 |
| Example 8 | Production method of second embodiment | 92 | 150 |
| Example 9 | Production method of second embodiment | 86 | 200 |
| Example 10 | Production method of second embodiment | 26 | 25 |
| Comparative Example 1 | Fiber article production method using long fibers (method described in Patent Document 1) | 19 | 25 |

As indicated in Table 1, it was confirmed that the collection efficiency of Examples 1 to 10 was higher than that of Comparative Example 1. The following can be given as the reason for this. In Examples 1 to 10, the plurality of first

REFERENCE SIGNS LIST

82 First fiber
83, 183 Fiber laminate 84, 184 Nonwoven fabric
91 Resin particle
91a Second fiber

The invention claimed is:

1. A dry-laid nonwoven fabric production method, comprising:
   affixing a plurality of resin particles including polymeric molecules to a plurality of first fibers;
   applying an external force to the plurality of first fibers to which the plurality of resin particles are affixed so as to reduce gaps between the first fibers:
   relieving the applied external force to form in gas, from the plurality of resin particles, second fibers each having an outer diameter smaller than that of each of the first fibers and the outer diameter of each of the second fibers having a value in a range from 30 nm to 1.0 μm; and
   forming a nonwoven fabric that is a fiber composite including the first fibers and the second fibers.

2. The nonwoven fabric production method according to claim 1, wherein the external force is applied to the plurality of the first fibers to which the plurality of resin particles are affixed while the plurality of first fibers and the plurality of resin particles are heated.

3. The nonwoven fabric production method according to claim 2, wherein the plurality of first fibers and the plurality of resin particles is set to are heated to a heating temperature having a value in a range from 70° C. to 200° C.

4. The nonwoven fabric production method according to claim 1, wherein a carding process is performed on the plurality of first fibers to form the plurality of first fibers into a sheet shape, and the plurality of resin particles are affixed to the plurality of first fibers subjected to the carding process.

5. The nonwoven fabric production method according to claim 4, wherein the plurality of first fibers formed into the sheet shape by the carding process are overlapped to form a fiber laminate, and
   the plurality of resin particles are affixed to the plurality of first fibers of the fiber laminate.

6. The nonwoven fabric production method according to claim 1, wherein a length dimension of each of the first fibers is a value in a range from 10 mm to 100 mm.

7. The nonwoven fabric production method according to claim 1, wherein the polymeric molecules comprise at least one selected from the group consisting of polytetrafluoroethylene, polypropylene, polyethylene, and polyamide.

8. The nonwoven fabric production method according to claim 1, wherein at least some of the plurality of resin particles are bonded to one another to form secondary particles.

9. The nonwoven fabric production method according to claim 1, wherein the external force has a value of 0.05 MPa or greater.

10. The nonwoven fabric production method according to claim 1, wherein the plurality of resin particles have a mean particle size of a value in a range from 100 nm to 100 μm.

11. The nonwoven fabric production method according to claim 1, wherein a weight ratio W1/W2 of a total weight W1 of the first fibers to a total weight W2 of the second fibers has a value in a range from 3.00 to 200.00.

* * * * *